(12) United States Patent
Wolters

(10) Patent No.: US 6,879,078 B2
(45) Date of Patent: Apr. 12, 2005

(54) ELECTRIC MOTOR WITH EXTERNAL ROTOR

(75) Inventor: Laurens Wolters, Lichtenvoorde (NL)

(73) Assignee: NeoDrive LLC ( * ) Notice: Subject to any disclaimer, the term of this patent is extended or adjusted under 35 U.S.C. 154(b) by 0 days.

(21) Appl. No.: 10/064,427

(22) Filed: Jul. 12, 2002

(65) Prior Publication Data

US 2002/0158543 A1 Oct. 31, 2002

Related U.S. Application Data

(63) Continuation of application No. PCT/US01/01278, filed on Jan. 12, 2001.
(60) Provisional application No. 60/175,782, filed on Jan. 12, 2000.

(51) Int. Cl.[7] .............................................. H02K 15/02
(52) U.S. Cl. ..................... 310/217; 310/216; 310/254; 310/42
(58) Field of Search ................................ 310/216–217, 310/254, 42; 29/596–598

(56) References Cited

U.S. PATENT DOCUMENTS

| | | | | |
|---|---|---|---|---|
| 1,467,938 A | * | 9/1923 | Janette | 403/252 |
| 1,762,017 A | * | 6/1930 | Grenzer | 29/598 |
| 3,238,404 A | * | 3/1966 | Spiess | 310/217 |
| 4,188,712 A | * | 2/1980 | Burns | 29/596 |
| 4,665,333 A | | 5/1987 | Heim et al. | 310/154 |
| 4,682,069 A | | 7/1987 | Stahl | 310/261 |
| 4,987,330 A | | 1/1991 | Murphy et al. | 310/217 |
| 5,057,733 A | | 10/1991 | Sonoda et al. | 310/269 |
| 5,066,882 A | * | 11/1991 | Sargeant | 310/217 |
| 5,809,638 A | * | 9/1998 | Neuenschwander | 29/609 |
| 5,918,728 A | | 7/1999 | Syverson | 198/788 |

FOREIGN PATENT DOCUMENTS

| | | | | |
|---|---|---|---|---|
| DE | 2346386 | 3/1974 | | H02K/37/00 |
| FR | 2650712 | 2/1991 | | H02K/1/17 |
| JP | 61098143 | 5/1986 | | H02K/21/00 |
| JP | 4161050 | 6/1995 | | H02K/37/12 |
| WO | WO 99/65134 | 12/1999 | | H02K/7/10 |

* cited by examiner

*Primary Examiner*—Burton Mullins
(74) *Attorney, Agent, or Firm*—McGarry Bair PC

(57) ABSTRACT

An electric motor comprises a stator fixedly mounted to a shaft and a rotor, surrounding the stator, rotatably mounted to the shaft. The shaft is stiffened by a plurality of plates mounted to the shaft and held thereon under significant compression by a lock nut. The compression is high enough to inhibit bending that would otherwise occur from external forces acting on the shaft. The plates also form the windings for the motor.

25 Claims, 28 Drawing Sheets

ELECTRIC MOTOR WITH EXTERNAL ROTOR

CROSS REFERENCE TO RELATED APPLICATIONS

This application claims priority of U.S. Provisional Application No. 60/175,782, filed Jan. 12, 2000 and PCT/US01/01278 filed Jan. 12, 2001.

BACKGROUND OF INVENTION

1. Field of the Invention

The invention relates to improvements in an electric motor; and more particularly, to an electric motor having an external rotor.

2. Description of the Related Art

Electric motors are commonly used in many different commercial and residential applications. An electric motor typically comprises a rotor and a stator, each of the rotor and stator having multiple magnets disposed about the periphery. The poles of the magnets on the rotor and the poles of the magnets on the stator are controlled such that the poles of the rotor are drawn to or repulsed from a corresponding pole on the stator to effect the rotation of the rotor relative to the stator. The control of the poles is normally accomplished by at least one of the series of magnets on either the rotor or stator being made from an electromagnetic winding whose polarity can be altered by changing the direction of current passing through the winding.

In most electric motors, the stator is part of or forms the external housing of the electric motor and the rotor comprises a shaft mounted within the stator for relative rotation therein. However, in some applications, it is desirable for the rotor to be on the outside of the motor and the stator to be on the inside. This arrangement is sometimes called a squirrel cage motor. Most often, they are driven with brushless commutators and DC power, so they are also often called brushless DC motors (BLDC's). An electric motor having an external rotor is typically used to drive belts and the like while being positioned within the interior of the belt. A suitable application for such a configuration would be a materials handling environment or a treadmill.

Several problems are attendant to squirrel cage motors in materials handling applications. One difficulty associated with electric motors with external rotors is that power output is normally capped so that only short material handling runs can be driven by a single motor and only relatively light weight articles can be propelled by the motor. Greater output power from an electric motor is typically achieved by increasing the size of the components. But for a squirrel cage motor, increased size is impractical. A larger diameter stator is undesirable because of added weight and the balance condition of the rotor. A longer length of the stator can result in deflection of the shaft mounting the stator in response to the magnetic attraction between the rotor and the stator causing the rotor and stator to contact, reducing the motor's performance or, in extreme cases, prohibiting motor rotation altogether.

Another difficulty is cooling the motor, especially at higher speeds or torques. At light loads or low speeds, cooling is not a problem, but with demands for such motors having more power output and higher speeds, the need for transferring heat away from the rotating parts becomes apparent. Most small squirrel cage motors in material handling applications are cooled by internal oil, which creates seal problems.

Other problems with such motors include noise, assembly, and accurately controlling commutation for smooth operation at low speeds and changes in speeds under torque. With higher torque output, especially at higher speeds, vibrations and consequent noise can become unacceptable. Moreover, it is known to determine the position of the rotor relative to the stator by means of a Hall effect sensor. But it has been found that the accuracy of this method for controlling fine changes in speed or torque is unacceptable. Yet further, the length of such motors is limited by their structures. For applications where wider belts are needed, e.g., treadmills, such a motor cannot effectively be a drive roller because it is not long enough.

SUMMARY OF INVENTION

These and other problems are solved by the present invention of an electric motor of the type comprising an internal stator, including a shaft fixedly mounted to a structural support and having multiple windings capable of reversible current flow to alter the winding polarity, and an external rotor rotatably mounted to the shaft and having multiple magnets radially spaced about the periphery of the stator, with each of the magnets having at least one predetermined pole. The stator comprises a plurality of plates on the shaft under compression in a range of approximately $6 \times 10^4$ and $10 \times 10^4$ Newtons to sufficiently inhibit bending of the shaft due to external forces that would otherwise tend to cause the windings to contact the magnets. Ideally, the spacing between the magnets and periphery of the stator is approximately 1 mm or less. The magnets are typically neodymium.

Preferably, the plurality of plates forms a winding core that carries the multiple windings. The plates form winding poles with caps on the end of each pole to retain the windings on the winding poles. The plurality of plates preferably comprises approximately 980 plates.

In one aspect, the plates are held in the compression range by at least one lock nut. The locknut is preferably threaded onto the shaft. The shaft can have an annular shoulder and the plurality of plates can compressed between the locknut and the annular shoulder. The length of windings is preferably less than about 20 inches and the ratio of the length of the windings to the diameter of the external rotor is preferably approximately 5:1.

In another aspect, the plurality of plates form winding poles that define a winding axis, oriented such that the winding axis is not parallel to the shaft longitudinal axis. Preferably, the winding axis is at an angle of at least 10 degrees relative to the shaft longitudinal axis.

DETAILED DESCRIPTION

Figure 1:
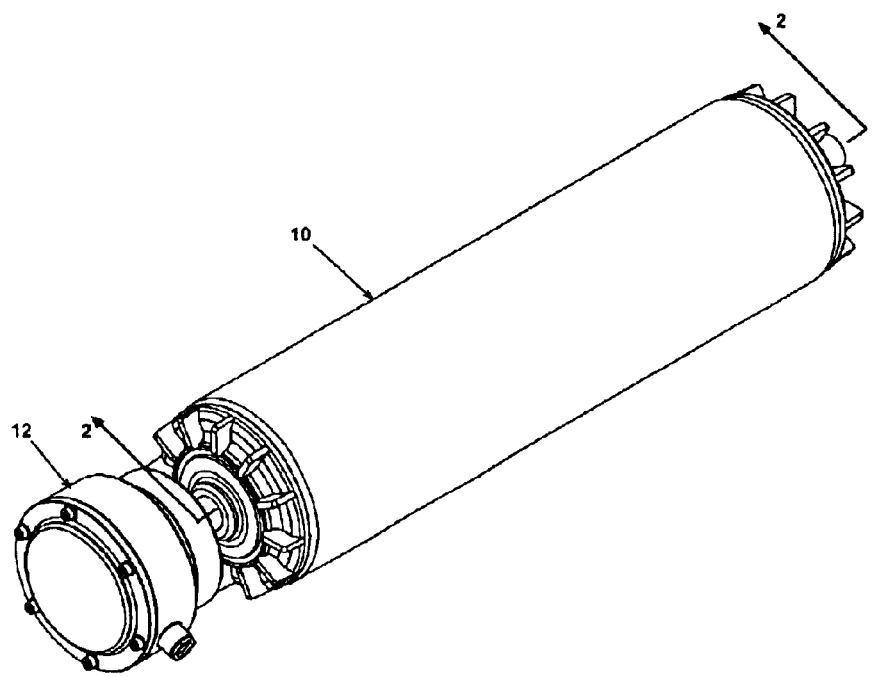
FIG. 1 illustrates an electric motor with an external rotor according to the invention.
Figure 2:
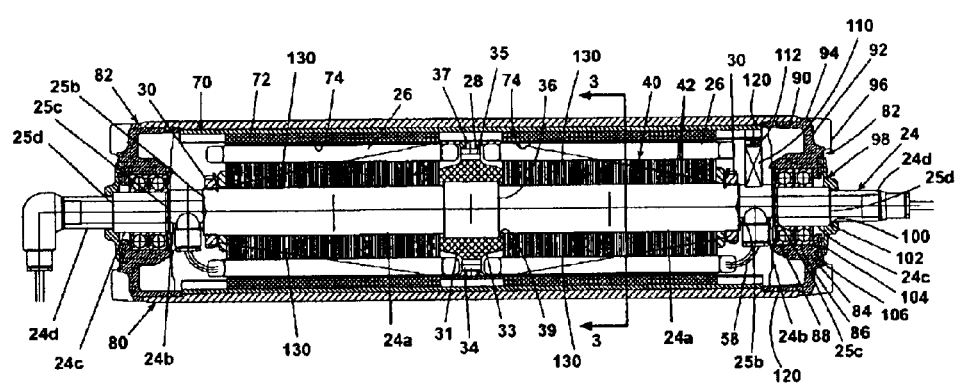
FIG. 2 is a sectional view of the electric motor taken along line 2—2 of FIG. 1.
Figure 3:
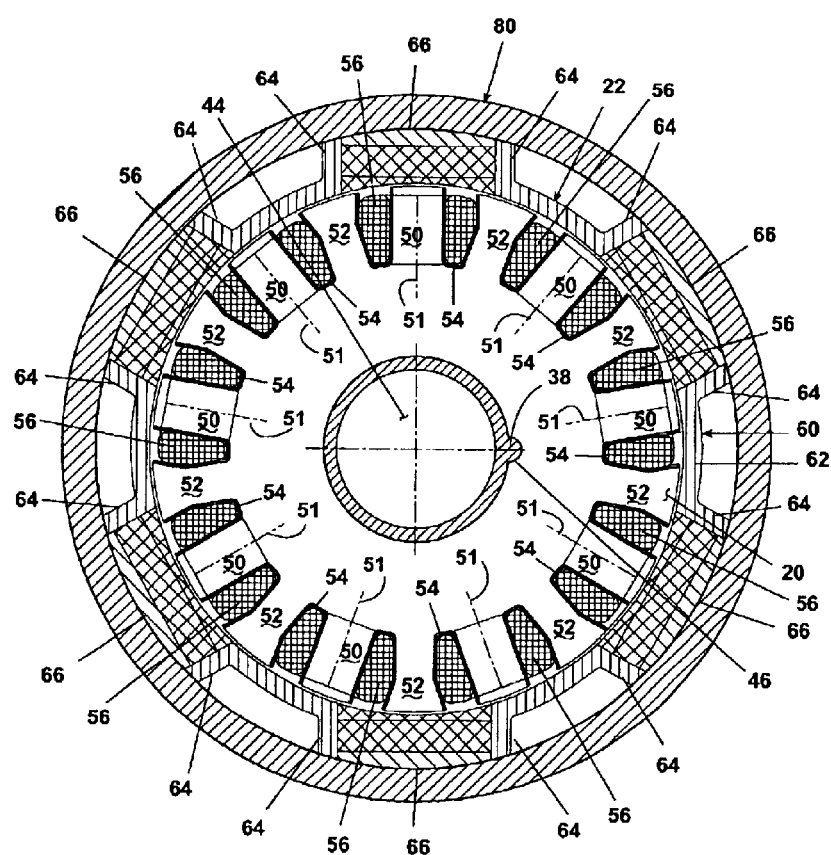
FIG. 3 is a sectional view of the electric motor taken along line 3—3 of FIG. 2.
Figure 4:
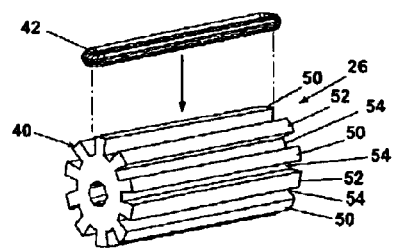
FIG. 4 is a perspective view of one coil module of the stator according to the invention.
Figure 5:
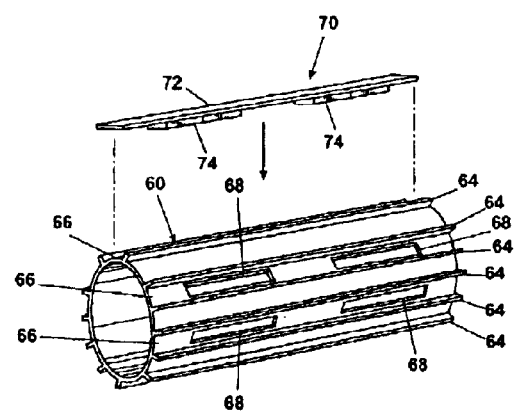
FIG. 5 is a perspective view of the rotor cage according to the invention.

FIGS. 1–3 illustrate a first embodiment of an electric motor 10 in accordance with one aspect of the invention along with a control system 12 for controlling the operation of the electric motor 10. The electric motor 10 comprises a stator 20 positioned within a rotor 22. The stator 20 comprises a shaft 24 on which are fixedly mounted multiple winding assemblies 26 (see also FIG. 4), separated by a spacer 28. Locking washers 30 fix the winding assemblies 26 on the shaft 24 relative to the spacer 28.

The shaft 24 preferably has at least hollow end portions to form a conduit for the passage of electric wiring and the like as needed from the winding assemblies to the motor exterior. The shaft 24 has a centrally located large diameter portion 24a divided by a collar 36 that interacts with the spacer 28 to limit the longitudinal movement of the spacer 28 along the shaft 24 during assembly. The shaft includes multiple reduced diameter portions 24b, 24c, and 24d on each end of the large diameter portion 24a. The junction of each stepped-down diameter portion 24a–d creates a corresponding shoulder 25b, 25c, and 25d. A key 38 extends longitudinally along the shaft 24.

The spacer 28 comprises a central hub 31 and a peripheral wall 33 connected by a web 34. Multiple openings 35 extend through the web 34. A radial opening 37 extends through the peripheral wall 33 and intersects the web opening 35 to fluidly connect the exterior of the peripheral wall 33 with the space between the peripheral wall 33 and the hub 32. One end of the hub 32 includes an annular stop 39 extending into the central opening and is sized to abut the shoulder 36 of the shaft when the hub 32 is slidably mounted onto the shaft and thereby limit the longitudinal movement of the spacer.

The winding assemblies 26 each include a winding core 40 comprising a plurality of axially aligned disks 42 having an axial opening 44 and a keyway 46. The aligned axial openings 44 and keyways 46 of the plurality of disks 40 form an axial opening and keyway for the winding core 40.

The periphery of each disk 42 is formed with multiple winding poles 50, which are preferably spaced at 40 degree increments about the disk 42 and are separated by tabs 52. The aligned winding poles 50 define a winding axis 51. A winding channel 54 is formed about the periphery of each winding pole 50 and is sized to receive a winding 56 having a central pass through opening, permitting the winding 56 to be slidably mounted onto the winding pole 50.

A winding 56 is provided for each of the winding poles 50. The windings 56 are preferably formed from multiple windings of electrically conductive wire whose interstitial spaces are filled with an epoxy and heated to cure the winding into a rigid structure. Each winding is connected to the electrical control system 12 through a lead 58 (FIG. 2) passing through the hollow interior of the shaft 24.

The rotor 22 comprises a rotor cage 60, preferably an aluminum casting, having a generally cylindrical body 62 from whose outer surface extends pairs of parallel fingers 64, defining therebetween magnet slots 66. The magnet slots 66 are spaced at approximately 60-degree intervals about the periphery of the body 62. The body 62 has openings 68 located within the magnet slot 66.

The rotor 22 further comprises magnet assembly 70 comprising a cover 72, preferably made of steel, and two pairs of magnets 74. The magnets 74 are preferably positioned on the cover 72 so that the magnets 74 will fit within the magnet slots 66 of the body 62 when the cover 72 is positioned within the magnet slots 66.

The electric motor 10 further comprises an exterior housing 80 in which the rotor cage 60 is slidably received and the stator 20 is slidably received within the rotor cage 60. The housing is preferably made of carbon steel. The end of the housing 80 is closed by end caps 82, which are preferably made of aluminum. The end caps 82 comprise a central hub 84 having a recess in which is slidably mounted a ceramic bearing 86, which is held within the hub 84 by a snap ring or similar retainer 88, received within an axial groove near the interior opening of the recess.

The central hub 84 is connected to a peripheral wall 90 by a radial web 92. The peripheral wall 90 has an outer diameter substantially equal to the inner diameter of the housing. The radial web 92 includes an annular stop 94 extending radially beyond the peripheral wall 90. The annular stop 94 has an outer diameter greater than the inner diameter of the housing 88 and limits the insertion depth of the end cap peripheral wall 90. A series of fins 96 are formed in the radial web 92 and extend axially inwardly and outwardly therefrom. The fins 96 aid in the cooling of the interior temperature of the electric motor 10 as the motor rotates. In essence, the fins 96 function as a heat sink, which are air-cooled.

The end caps 82 further include a cover 98 having an axial opening 100 into which extends an annular stop 102. Concentric rings 104 are formed in the cover 98 and correspond to concentric rings 106 on the exterior of the end cap 82. The concentric rings 104 and 106 nest when the cover 98 is slidably mounted onto the shaft 24 and form a labyrinth seal to block the introduction of dust and other particles into the interior of the motor.

The control system 12 comprises a Hall sensor 110 located on the shaft 24 and corresponding elements 112 mounted on the rotor cage 60. The elements 112 are positioned to correspond with the poles of the magnets 74. The Hall sensor 110 is connected to an electrical circuit (not shown) that alters the direction of the current passing through the windings 56 to propel the rotor cage 60 about the stator 20. This type of electrical control is widely known and will not be described in greater detail.

Assembly of the First Embodiment of the Electric Motor

The assembly description below contains many steps. The sequence of many of these steps is not important. Therefore, the assembly description is mainly for illustrating the steps needed to assemble the electric motor 10 and the interconnection of the various parts. The assembly description is not intended to be limiting in the sequence of the assembly steps.

Figure 6:
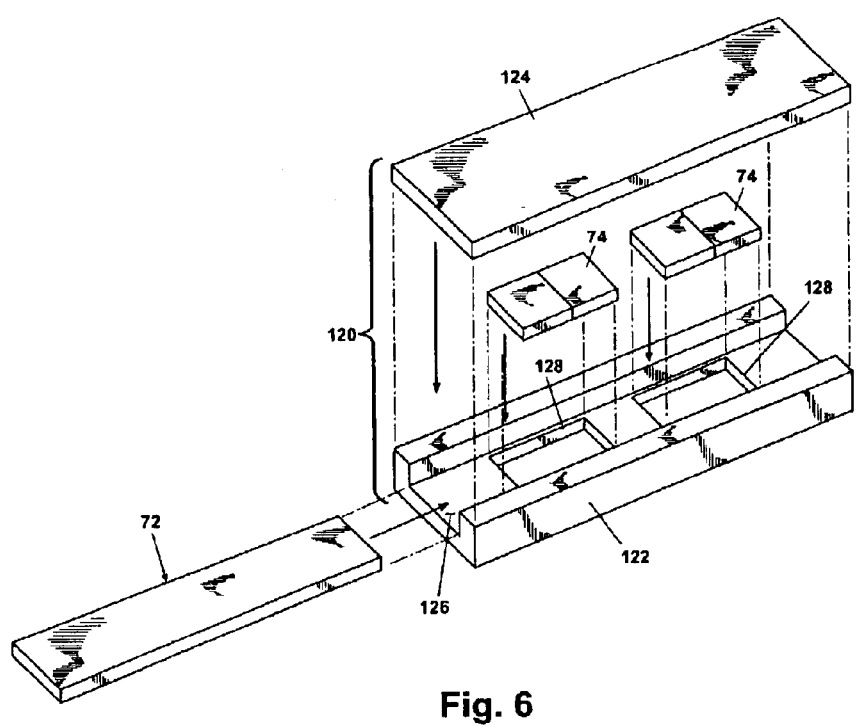
FIG. 6 is a perspective view of a jig for assembling the stationary magnets of the rotor cage.

Referring to FIG. 6, the assembly of the electric motor 10 begins by assembling the magnets 74 to the cover 72. The magnets 74 are preferably made from neodymium, which has a very high magnetic density. For example, each of the magnet pairs for one magnet slot 66 has 350 pounds of separation force. Given the large magnetic density and the correspondingly large magnetic forces for the magnets 74, it is imperative that the magnets be handled with care and not brought within close proximity to each other or to another magnetic object during assembly, unless it is desired for the magnets to magnetically couple with the object.

Referring to FIG. 6, in assembling the magnets, a jig 120 comprising a base 122 and a cover 124 is provided to attach the magnets 74 to the cover 72 in a predetermined orientation so that the magnets will fit within the magnet opening 68 in the body 62 of the rotor cage 60. The jig bottom 122 has a U-shaped cross section defining a channel 126, which is sized to slidably receive the cover 72. Positioning openings 128 are provided in the channel 126 at a spacing corresponding to the spacing of the openings 68 in the magnet slots 66.

To assemble the magnets 74 to the cover 72, the magnets in pairs are positioned within the positioning openings 128. The openings are sized so that the tops of the magnets 74 are co-planar with or slightly below the bottom of the channel 126. The cover 124 is then placed atop the jig bottom 122 to close the open top of the channel 126. The cover is preferably clamped in place to the jig 120. The magnet cover 72 is then slidably inserted into one of the open ends of the jig 120. As the steel magnet cover 72 encounters the magnets 74, the magnets will attach themselves to the magnet cover 72. The coefficient of fiction between the magnet cover 72 and the magnets 74 is sufficiently low enough that a relatively small force (approximately 70–80 pounds for the magnets of the invention) is required to slide the cover 72 with respect to the magnets 74 as compared to the separating force (approximately 350 pounds) to pull the magnets off of the cover 72. If need be, a small amount of lubricant can be placed on either the cover 72 or the magnets 74 to reduce the coefficient of friction and thereby reduce the force needed to slide the cover 72 over the magnets 74. When the cover 72 is completely positioned within the jig 120, the jig cover 124 is unclamped and removed. The magnet cover 72 is then lifted out of the open top of the channel 126, carrying with it the magnets 74, which are properly oriented for insertion into the rotor cage 60.

The process of mounting the magnets 74 to the magnet cover in their predetermined position is repeated for the number of magnet assemblies 70 required for the particular rotor cage 60. As illustrated, six magnet assembly 70 are required. However, fewer or more magnet assemblies may be used depending on the size of the motor. The completed magnet assemblies 70 should be stored far enough away from each other after assembly to avoid the magnets of one magnet assembly from coupling with another magnet assembly.

Once the magnet assemblies 70 are assembled, they are placed into the magnetic slot 66 of the rotor cage 60, preferably by simultaneously punching the magnet assemblies 70 within the magnet slot 66. Since the rotor cage 60 is preferably made from a non-magnetic material, such as aluminum, the magnetic interaction between the magnets 74 and the rotor cage 60 is not of great importance.

Moving on to the assembly of the stator 20, initially, each winding core 40 is assembled in a traditional manner. The windings 56 are slidably mounted over the winding poles 50. This process is repeated for the number of winding assemblies needed for the particular motor. As illustrated, the electric motor 10 requires only two winding assemblies 26. However, it is within the scope of the invention for less or more winding assemblies to be needed and is dependent upon the particular operational parameters, especially power output, of the electric motor 10. For a given winding assembly 26, the more winding assemblies, the more power the motor will generate.

Figure 7:
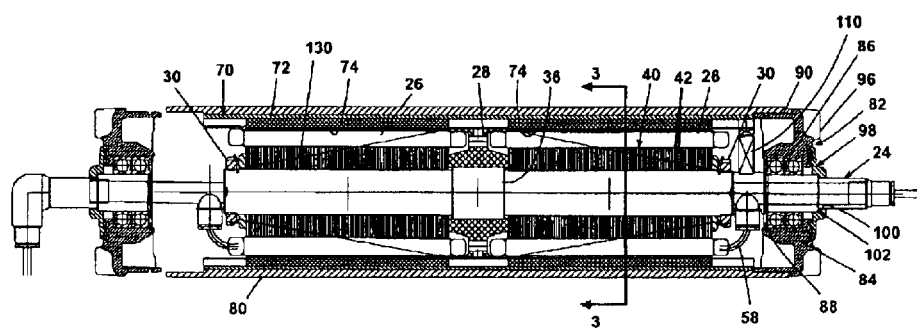
FIG. 7 is a perspective assembly view showing the major steps of assembly for the stator.

Referring to FIG. 7, once the winding assemblies 26 are completed, the stator 20 is assembled by mounting the winding assemblies 26, spacer 28, and one of the end caps 82 to the shaft 24. Initially, the spacer 28 is slidably mounted onto one end of the shaft until the annular stop 37 abuts the shaft collar 36. The winding assemblies 26 are then oriented relative to the shaft 24 so that the keyway 46 in the winding assemblies 26 aligns with the key 38 on the shaft 24. The winding assemblies 26 are slid onto the shaft 24 until the winding cores 40 abut the hub 32 of the spacer 28. The locking washers 30 slidably mount over the opposing ends of the shaft into abutting relationship with the winding core 40, and lock in place to hold the winding core 40 against the spacer 28, which is in abutting relationship with the shaft collar 36.

It is worth noting that when the winding assemblies 26 are mounted to the shaft 24, the inner ends of the windings 56 are received between the peripheral wall 33 and hub 32 of the spacer 28. The ends of the hub 32 and the peripheral wall 33 are in abutting relationship with the winding core 40 to effectively close off the open ends of the spacer 28 and enclose the ends of the windings 56 therein. Thus, the inner ends of the windings 56 are retained within the closed interior of the spacer 28 through which access is provided by the web openings 35 and the corresponding peripheral wall openings 37.

A resin material is injected into the closed interior of the spacer 28 through the peripheral wall openings and web openings 35. A sufficient quantity of resin is injected to completely fill the interior of the spacer 28. The stator subassembly of the shaft 24, winding assemblies 26, and spacer 28 filled with resin, is heated to a temperature suitable to cure the resin.

The stator subassembly obtained from the shaft 24, winding assemblies 26, spacer 28, and baked resin fill yields a structure having a bending stiffness much greater than that of the shaft 24 alone. The increased stiffness is attributable to the effectively increasing cross-sectional area of the subassembly in light of the close fit between the winding cores 40 and the shaft 24, the compressive mounting between the winding cores 40 and spacer 28, and the resin filled spacer 28. The lines 130 in FIG. 2 represent an effective diameter of a shaft made in accordance with the shaft 24, but having the effective stiffness of the subassembly.

It should be noted that it is presumed by this time that the electrical leads for the windings 56 are connected to the electrical conduits extending through the interior of the shaft 24. Since the connection of the electrical leads is well known and does not form a substantive portion of the invention, it will not be described in greater detail. It should also be noted that the hall sensor 110 is mounted to the shaft 24 in a traditional manner after the shaft subassembly is completed.

Once the shaft subassembly is completed, one of the end caps 82, which already has its ceramic bearing 86 installed, is mounted onto the end of the shaft 24 by sliding the shaft through the opening in the hub 84 of the end cap until the end of the bearing abuts the shoulder 25c of the reduced diameter portion 24b of the shaft 24 and cover stop 102 abuts the shoulder 25d on the reduced diameter portion 24c of the shaft 24.

Figure 8:
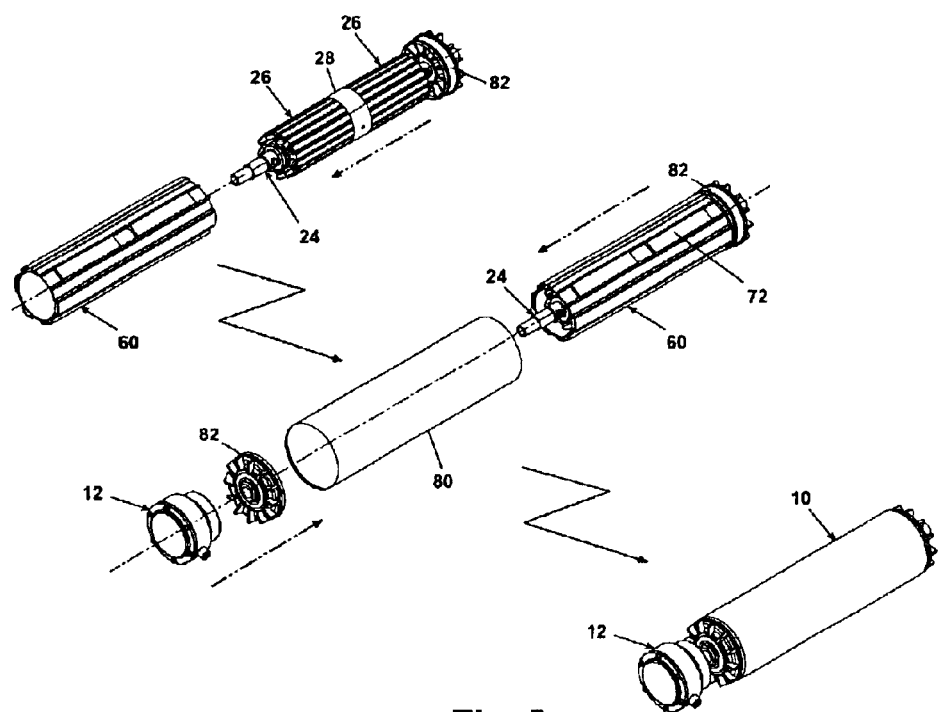
FIG. 8 is an assembly view showing the major steps of assembly of the rotor to the stator.

Referring to FIG. 8, the shaft subassembly along with the corresponding end cap 82 is slidably mounted within the rotor body 62. As the first winding assembly 26 is received within the interior of the rotor cage body 62, the magnets 74 will pull the windings into contact with the magnets. As with the mounting of the magnets 74 to the magnet cover 72, although the magnets have a very strong separation force, the coefficient of friction is sufficiently low enough that the stator subassembly can be slid within the interior of the rotor cage body 62. If necessary, a lubricant can be positioned on either the shaft subassembly or the interior of the rotor cage body 62 to enhance the ease of sliding.

The subassembly of the starter and rotor is slidably mounted within the housing 80. Upon the insertion of the rotor/stator subassembly, the magnets 74 will couple with a portion of the housing 80, resulting in the longitudinal axis of the housing 80 and the shaft 24 being slightly offset. As the rotor/stator subassembly is completely inserted, the tapered surface 120 on the end cap peripheral wall 90 will contact an edge of the housing and center the shaft 24 relative to the housing 80 at that end. The wedge effect of the tapered surface 120 uncouples some of the magnets from the housing 80, resulting in a skewing of the housing and shaft longitudinal axis.

Although not necessary, it is preferred that the inner surface of the housing have one or more embossments and the peripheral wall 90 of the end cap 82 have a corresponding number of indentations or grooves so that upon the insertion of the end cap peripheral wall 90 into the open end of the housing 80, the embossments will slightly deflect the peripheral wall 90 until they are received within the corresponding indentations or grooves to effectively lock the end cap 82 to the end of the housing 80.

To complete the assembly of the electric motor 10, the other end cap 82 is slidably mounted onto the opposing end of the shaft 24. It should be kept in mind that given the strength of the magnets 74 at least a portion of one side of the stator 20 will be in physical contact with the interior of the rotor cage body 62, resulting in the shaft 24 being slightly off axis with respect to the housing 80. The outer ends of the peripheral wall 90 of the end cap 82 are slightly tapered 120. With this configuration, as the second end cap 82 is inserted into the open end of the housing 80, the tapered or wedge-shaped outer edge of the peripheral wall 90 of the end cap 82 will contact the inner edge of a portion of the housing 80. The continued insertion of the peripheral wall 90 into the end of the housing 80 will start to align the longitudinal access of the shaft with the axially aligned longitudinal axes of the housing 80 and the rotor cage 60. Upon the complete insertion of the end cap 82, the winding assemblies 26 will be pulled away from their contact with the inner surface of the rotor cage body 62. The cover 98 is then slidably mounted over the shaft to close off the central hub 84 and seal the ceramic bearings 86 with respect to the atmosphere.

In the assembled position, there is approximately a 0.5 mm gap between the exterior of the winding assemblies 26 and the interior of the rotor cage body 62. Given the very great magnetic forces of the magnets 74, there is a tendency for the magnets to couple with the housing 80, which is fortunately resisted by the extraordinary stiffness of the stator subassembly. A motor according to the invention as described above produces peak power of 3.0 kilowatts and can operate at a steady state of 1.6 kilowatts at approximately 850 rpm with an efficiency of approximately 95%. The maximum constant torque produced is 18.2 Nm. The performance of the motor 10 is very great considering the relatively small size of the motor 10. The housing 80 has a length of approximately 417 mm and a diameter of 114.3 mm. Each winding assembly 26 is approximately 135 mm long.

Operation

The operation of the motor is controlled in a well-known fashion and will only be described in general details. As with all DC electric motors, the rotor is advanced relative to the stator by changing the polarity of the poles on the stator to either pull or push the permanent magnets on the rotor as the case may be. The stator according to the invention has nine poles 51 formed by the windings 56 disposed at approximately 40° intervals about the periphery of the stator. The permanent magnets on the rotor are spaced at 60° increments about the periphery of the rotor. The permanent magnets have a width slightly greater than the width of the winding.

When one permanent magnet pole is centered over one winding pole, the next permanent magnet is generally centered directly between the next to adjacent poles, with a portion of the permanent magnet overlying a portion of each of the windings. The subsequent magnet 74 is once again centered over a winding pole 51. Given the fixed physical relationship between the poles of the magnets 74 and the windings 56, the hall sensor 110 can be used to sense the pole location of the magnets and output a corresponding signal, which is used by the electronic control 12 to change the direction of the current passing through the windings to flip the polarity of the windings as needed to push or pull the magnet 74 as needed to continue the rotation of the rotor. Only one hall sensor is required since the number of permanent magnets and windings are known and spaced at known relationships. However, a hall sensor could be positioned about the stator for all or some of the poles of the windings 56 if desired.

The electronic control is capable of not only advancing the rotor relative to the stator, it can also reverse the direction of the rotor with respect to the stator. Similarly, the electronic control can effectively be used to brake either the advance or reverse operation of the electric motor. The techniques for advancing, reversing, and brake the electric motor by electronic control is well known and is not described in detail.

The speed of the motor is controlled by adjusting the magnitude of the voltage applied to the windings. As the voltage increases, the speed of the motor increases proportionately. Thus, a simple and well-known voltage control is all that is needed to control the speed of the motor. An advantage of using voltage control for controlling the speed of the motor is that the speed is essentially continuously adjustable within the limitations of the voltage supply to the electric motor and the internal resistance of the particular machine being driven by the motor.

During steady state operation, the motor will generate approximately 80 watts of heat energy. Given the small size of the motor compared to the power and heat it generates, it is important to dissipate the heat, especially given the negative performance impact the heat can have on the magnets 74. The fins on the end caps 82 function as an air-cooled heat sink to dissipate the heat energy emitted by the motor. As is seen in FIG. 2, the fins extend from the interior of the end cap to the exterior. The interior location of the fins aids in forcing air circulation within the interior of the motor and eliminating areas of heat build up. The rotation of the motor effects the rotation of the fins to circulate the air within the housing. An air circulation pattern within the housing can develop longitudinally by passing through the open spaces between the magnet slots 66 on the body 62. The fins on the end caps along with the shape of the rotor cage form a forced-air air-cooled heat sink that removes the heat energy without adding complexity to or increasing the size of the motor.

Applications

Figure 9:
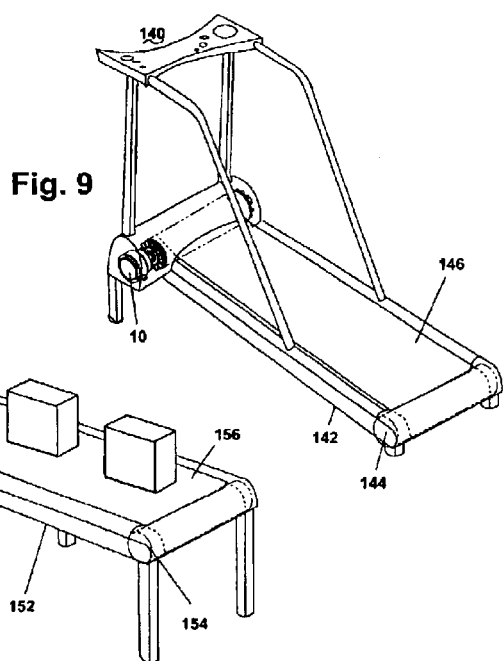
FIG. 9 is a perspective view of a treadmill incorporating the electric motor with external rotor according to the invention.

FIG. 9 illustrates one possible application for the electric motor 10 according to the invention. FIG. 9 shows a treadmill 140 comprising a deck 142 on one end is mounted an electric motor 10 according to the invention and on another end is mounted a roller 144. A belt is entrained about the housing 80 of the electric motor 10 and the roller 144 encaptures the deck therebetween. Since the belt 146 physically contacts the housing 80 of the electric motor 10, the rotation of the housing 80 will rotate the belt of the treadmill.

The electric motor 10 as described above preferably operates between 2 and 12 mph with corresponding power requirements of 0.27 kilowatts at 142 rpms and 1.60 kilowatts at 854 rpms.

Figure 10:
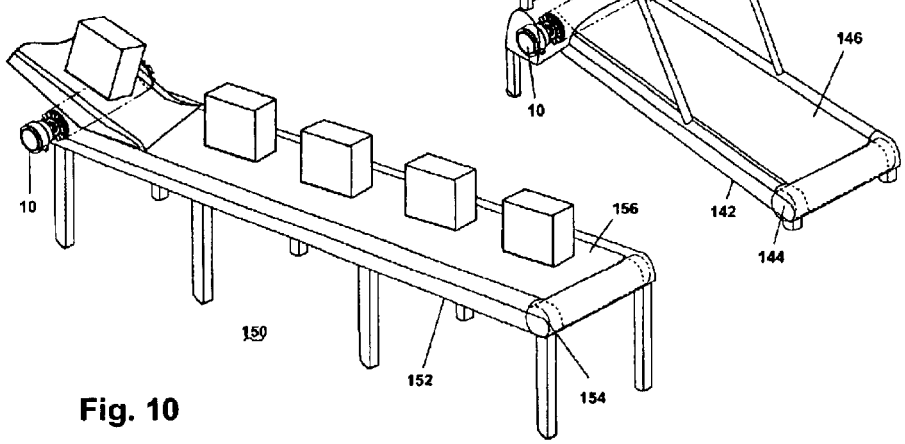
FIG. 10 is a perspective view of a portion of a materials handling system incorporating the electric motor with external rotor according to the invention.

FIG. 10 illustrates another application for the electric motor 10. In FIG. 10, a simple materials handling system is illustrated comprising a conveyor 150 having a deck 152, with the motor 10 mounted at one end and one or more rollers 154 mounted at various locations on the deck 152. A conveyor belt 156 is entrained about the rollers 154 and the electric motor 10. The rotation of the housing 80 affects the movement of the conveyor belt 156.

In either of these applications, the invention is advantageous over prior electric motors in that it has a relatively small diameter (114 mms) while having a relatively high output (1.6 kilowatts) for steady state operation. The low profile of the electric motor 10 permits its use in a variety of applications where there are limited space requirements. The reduced profile also reduces the size of the belt and inertial braking problems associated with larger diameter traditional motors.

Another advantage of the electric motor according to the invention is that the power output of the motor can be increased by simply adding on four winding assemblies 26 along with the necessary intervening spacers 28. Such a configuration will, of course, require a longer shaft 24. However, unlike prior designs, the length of the shaft is generally unimportant because the additional winding assembly 26 can include additional spacers 28, which together, form an effectively larger diameter shaft that greatly reduces deflection that was inherent in prior art motors, eliminating the negative result of the shaft deflecting sufficiently to permit the rotor and stator to contact during operation.

Second Embodiment

Figure 11:
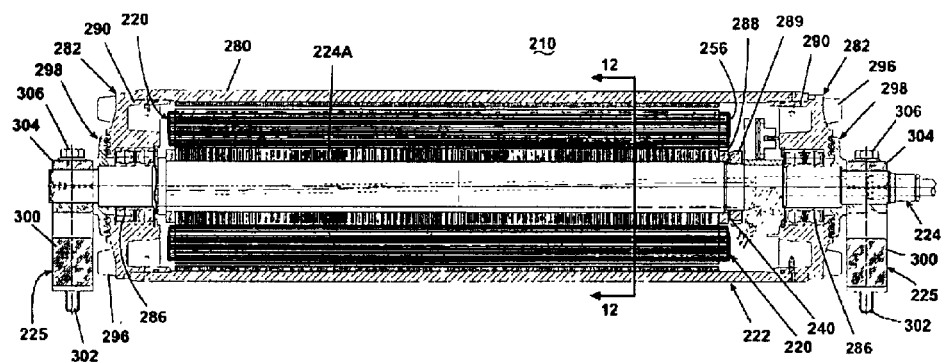
FIG. 11 is a longitudinal sectional view of the second embodiment electric motor illustrating the spatial relationship between the shaft, rotor, and stator of the second embodiment.
Figure 12:
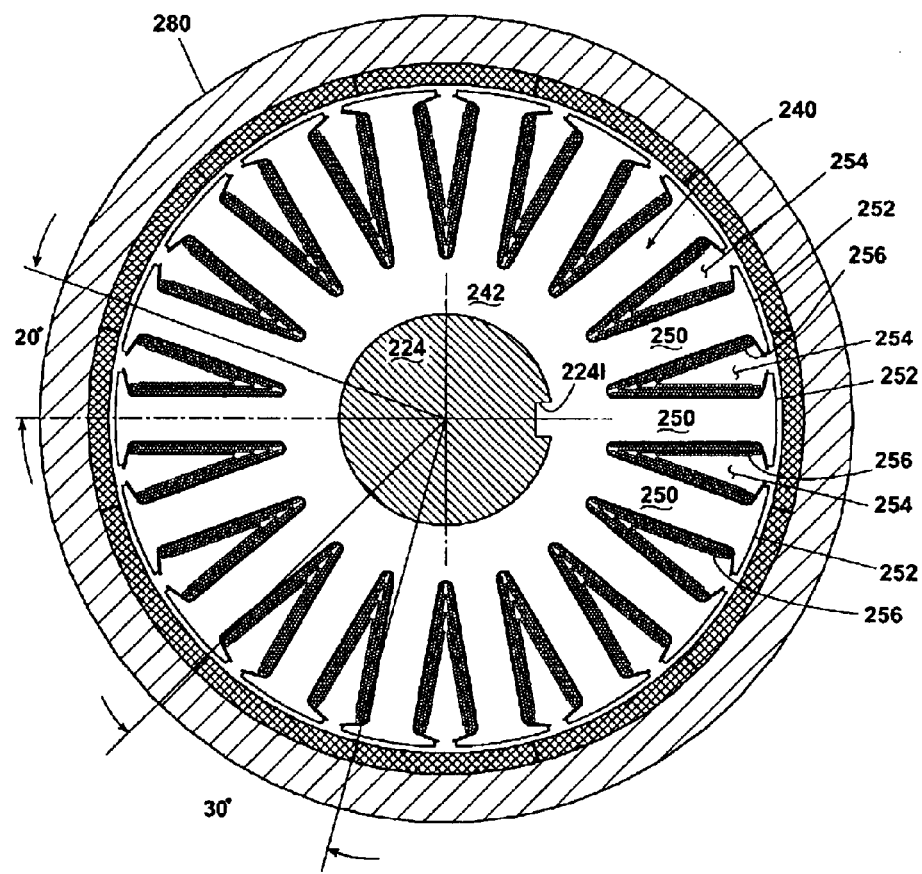
FIG. 12 is a sectional view taken along line 12—12 of FIG. 11.

FIGS. 11–12 illustrate a second embodiment electric motor 210 according to the invention. The second embodiment electric motor 210 comprises many components physically and functionally similar to or identical with the first embodiment electric motor 10. Therefore, to the extent possible, components of the second embodiment similar to those of the first embodiment will have a similar identifying numeral increased by 200.

The electric motor 210 includes an electric control system 212 that contains all of the electronics for controlling the operation of the electric motor 210. The electric control system is identical to the control system 12 and is therefore not shown. The electric control system 12 can be accomplished by many well known control systems and does not form any fundamental portion of this invention. Therefore, it will not be described in detail. In general the control system 12 should be capable of directly or indirectly monitoring the location of the poles of each winding in relation to the pole of the permanent magnets and using this information to control the switching of the current through the windings to effect the rotation of the rotor (forward or reverse), motor speed (generally by changing the amplitude of the voltage), motor acceleration/deceleration, which can include braking.

The electric motor 210 comprises a stator 220 mounted within a rotor 222. The stator 220 is fixedly mounted to a non-rotating shaft 224. The rotor 222 is rotatably mounted to the shaft 224. The ends of the shaft are fixedly held by mounting blocks 225, which mount the shaft to a structural element of the conveyor system or a structural element of the particular application.

Figure 13:
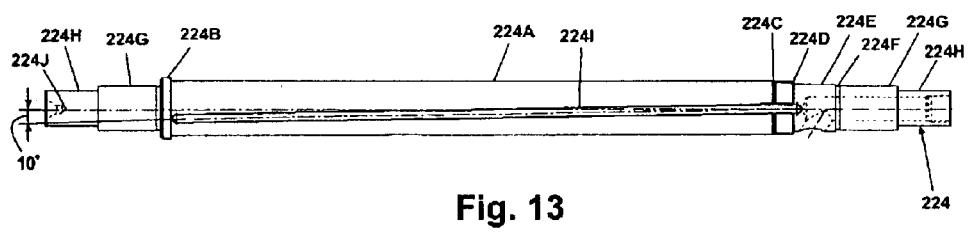
FIG. 13 is a plan view of the shaft illustrating an angled keyway.
Figure 14:
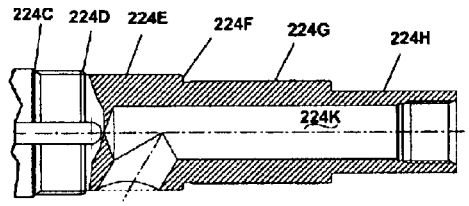
FIG. 14 is an enlarged partial sectional view of the one end of the shaft illustrating the internal passage for electrical conduits.

Referring to FIGS. 13 and 14, the shaft 224 comprises a constant diameter central portion 224A that terminates at one end at an annular shoulder 224B and at another end in an annular neck 224C. The annular neck 224C transitions to a locking ring portion 224D, which then transitions into a reduced diameter sensor mounting portion 224E. An annular groove 224F is disposed between the sensor mounting portion 224E and a bearing mounting portion 224G. A reduced diameter key 224H extends from the bearing mounting portion 224G. The other end of the shaft 224 outward from the annular shoulder 224B is similar in structure in that it includes an annular groove 224F, bearing mounting portion 224G and a key 224H. A stator keyway 224I extends along the length of the central portion 224A between the ends and is oriented at a 10 degree angle relative to a longitudinal axis 224J of the shaft 224. The keyway 224I is optional for reasons explained later in discussion of the assembly. An electrical conduit 224K is provided in one end of the shaft and provides a passageway for electrical wiring from the control system to the windings and any internal sensors.

Figure 15:
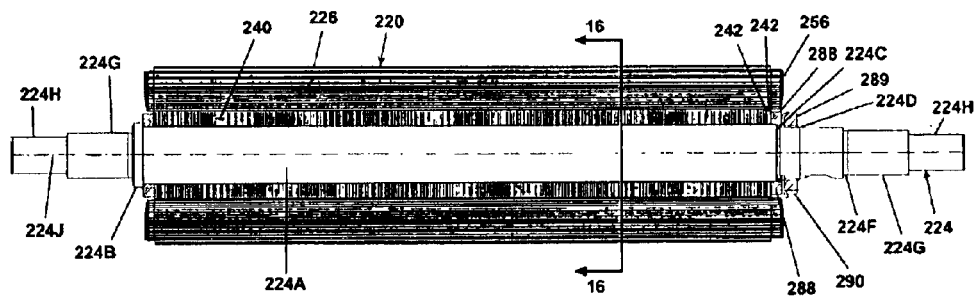
FIG. 15 is a longitudinal sectional view of the stator mounted to the shaft and excluding the rotor and end caps for clarity.
Figure 16:
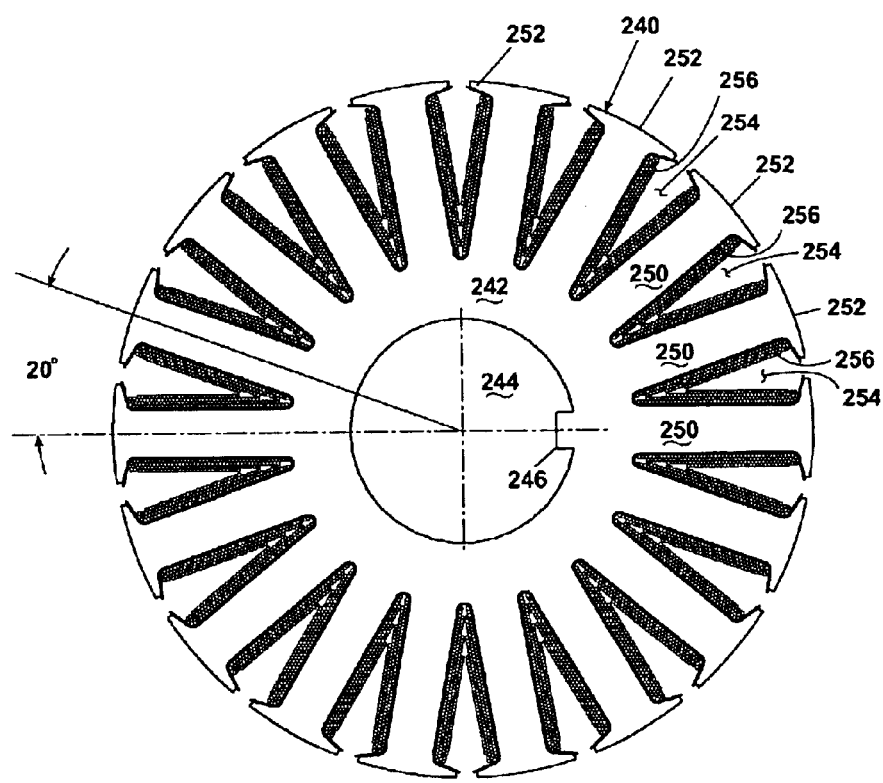
FIG. 16 is a sectional view taken along line 16—16 of FIG. 15 with the shaft removed for clarity.
Figure 17:
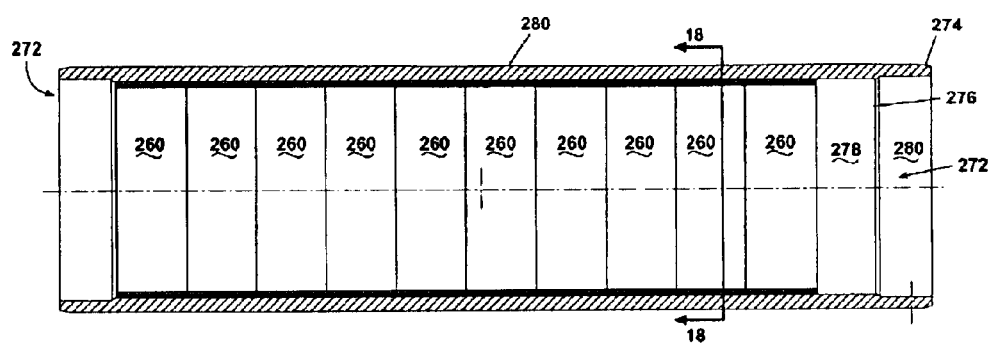
FIG. 17 is a longitudinal sectional view of the rotor and housing with the stator, shaft, and end caps removed for clarity.

Referring to FIGS. 15–16, the stator 220 comprises a single winding assembly 226 fixedly mounted to the shaft 224 in comparison to the multiple winding assemblies 26 of the first embodiment. The single winding assembly 226 is similar in structure to the winding assemblies of the first embodiment in that it comprises a winding core 240 about which multiple windings 256 are mounted. The winding core 240, as with the winding core 40, comprises a plurality of disks or plates 242. The plates form a series of winding poles 250 when they are mounted on the shaft. Each of the winding poles 250 terminates in a cap 252, which effectively retains the winding 256 thereto. The winding poles 250 are separated by winding channels 254.

The windings 256 are traditional and comprise wire wound about the winding poles 250. The winding channels 254 are filled with a resin, preferably a two component epoxy resin, to reduce vibrations.

The winding poles 250 are preferably spaced every 20° on center about the plates. The opposing ends of each of the winding poles are preferably radially offset 20° relative to each other, resulting in the opposing ends of adjacent winding poles being radially aligned. In other words, presuming a given direction of rotation, each winding will have a leading end and a trailing end. The trailing end of one winding is radially aligned with the leading end of the trailing winding.

Referring to FIGS. 11, 12, 17, and 18, the rotor 222 for the second embodiment electric motor 210 is different than the first embodiment electric motor 10 in that a rotor cage is not necessary since the permanent magnets are mounted directly to the exterior housing. The second embodiment rotor 222 comprises a housing 280 in which are slidably received multiple metal rings 260.

The housing 280 is essentially identical to the housing 80 of the first embodiment. The housing 280 has a generally cylindrical shape with open ends 272. The exterior of the housing has a tapered portion 274 adjacent the open ends 272. An annular collar 276 is positioned within the hollow interior of the housing and forms a demarcation between a first inner diameter 278 and a second inner diameter 280. The first inner diameter corresponds to the outer diameter of the rings 260. The second inner diameter 280 extends from the collar 276 to the open end 272 and is greater in diameter than the first inner diameter 278.

The metal rings 260 are bonded to the interior of the housing 280 once they are positioned at their desired location. Preferably, the metal rings are made from neodymium iron boron. In the illustrated embodiment, the rings have an outer diameter of 10.43 centimeters and an inner diameter of 9.83 centimeters. Each of the rings is 3.35 centimeters wide, with 10 rings extending across the interior of the housing 280 for a total length of 33.5 centimeters.

The metal rings 260 are magnetized after they are bonded to the interior of the housing 280. The magnetization of the metal rings 260 after their insertion and mounting to the housing 280 substantially eliminates the assembly difficulties associated with the first embodiment rotor related to the strength of the neodymium iron boron magnets.

Figure 18:
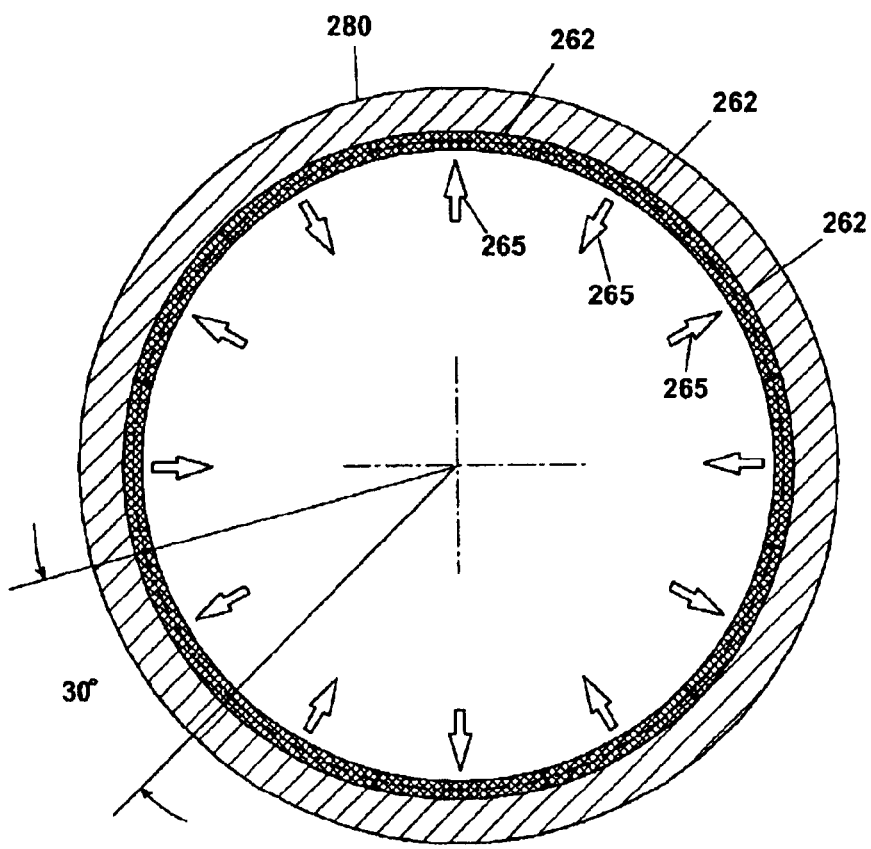
FIG. 18 is a sectional view taken along line 18—18 of FIG. 17 and illustrating the change of direction of the magnetic flux for the stator.

Referring to FIG. 18, the metal rings 260 are magnetized in a manner such that each ring has segments 262 of alternating magnetic flux direction. The arrows 265 in FIG. 16 show the direction of the magnetic field for the corresponding segment 262. Preferably, the segments 262 alternate in magnetic flux approximately every 30° on center about the ring 260.

The 30° spacing of the segments 262 cooperates with the 20° spacing of each of the winding cores such that as the leading end of one winding pole is rotating beyond a given segment 262, approximately one half (a 10° arc) of the trailing winding pole is disposed beneath the given segment. The overlap between the adjacent windings and the given segment results in a more continuous power output for the motor as compared to the first motor where there is no overlap in the windings relative to a given segment or magnet. The amount of overlap between adjacent windings and a given magnet can vary depending on the power output requirements of the motor.

The controller switches the current through the windings 256 in much the same manner as the windings 56 to effect the rotation of the rotor 220. In essence, the current is switched direction when the centerline of the permanent magnet passes the centerline of the corresponding winding so that the winding initially pulls the permanent magnet toward the winding centerline and then pushes the permanent magnet away from the winding centerline. It should be noted that the angular orientation of the windings relative to the longitudinal axis of the permanent magnets will typically lead to the switching of the current as the longitudinal center point of the permanent magnet passes the longitudinal center point of the winding.

Figure 19:
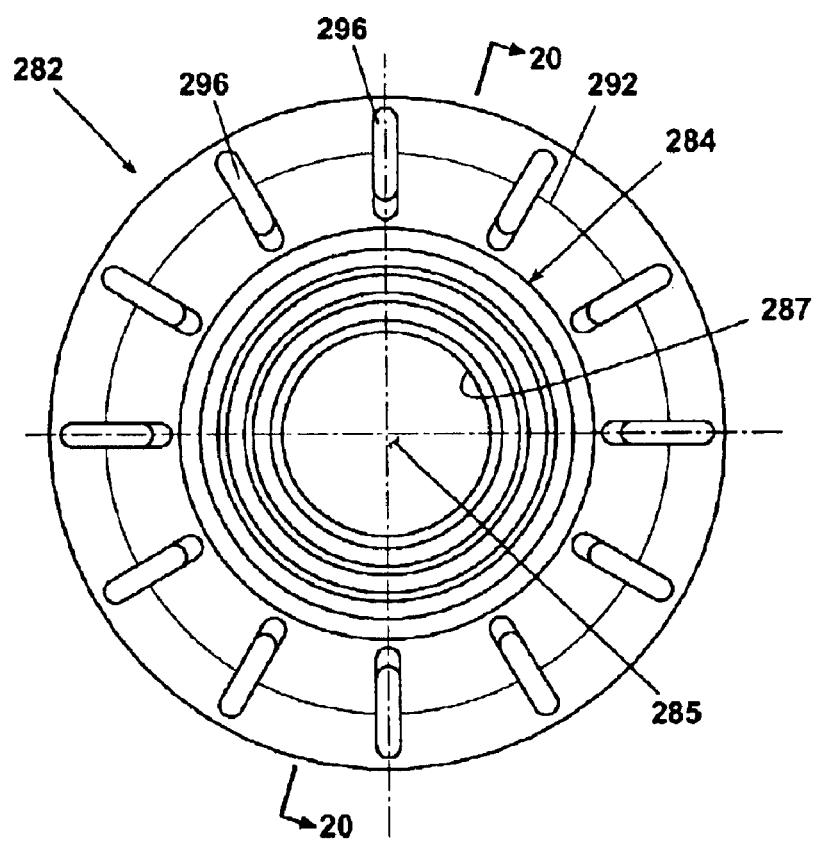
FIG. 19 is an end view of an end cap for closing an open end of a housing for the electric motor according to the invention.
Figure 20:
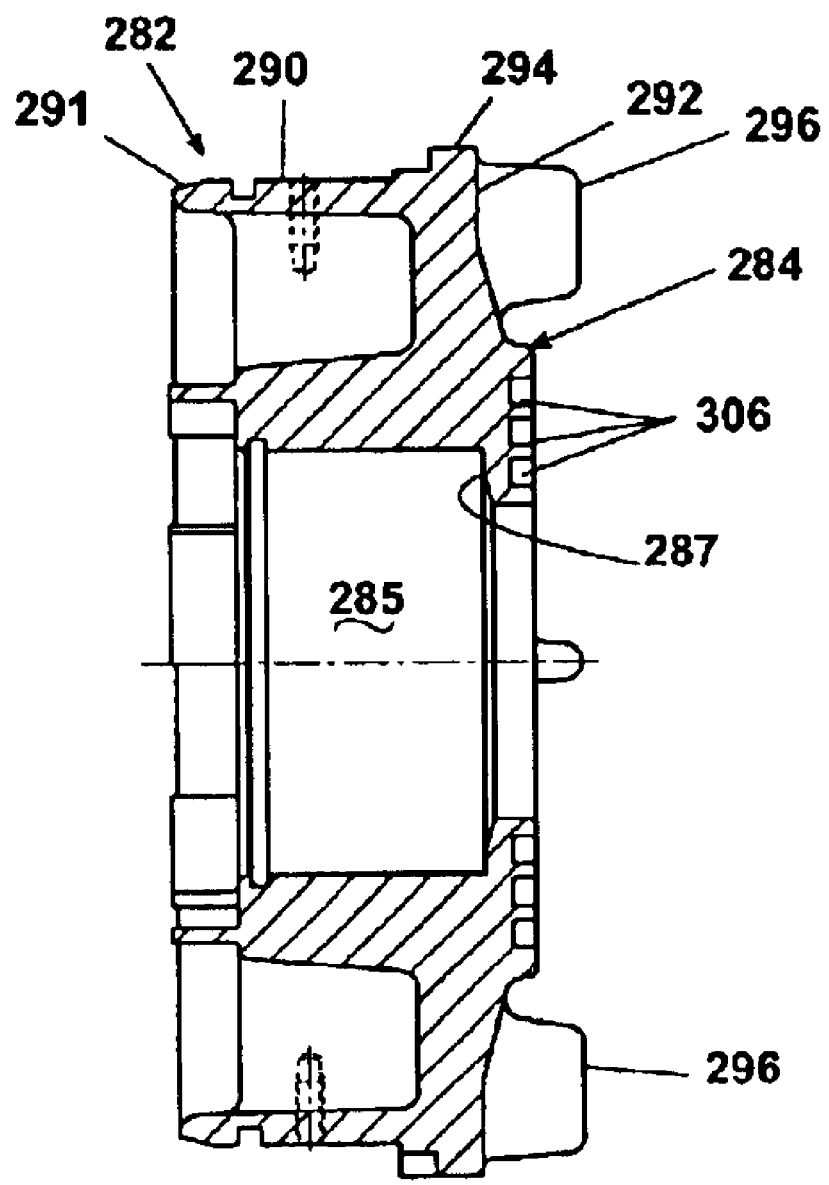
FIG. 20 is a sectional view taken along line 19—19 of FIG. 19.

Referring to FIGS. 19–20, end caps 282 are provided to close the open ends 272 of the housing 280. The end caps 282 are identical to the end caps 82 and comprise a central hub 284 defining a through opening 285 having a stop 287, which collectively form a seat for ceramic bearing 286. An annular groove 288 is located at the inner end of the central hub. A peripheral wall 290 connected by a radial web 292 extending from the central hub 284. A portion of the radial web 292 extends beyond the peripheral wall 290 to form a peripheral stop 294. The tips of the peripheral wall 290 are tapered 291 to aid in the insertion of the end caps into the housing 280. Fins 296 extend outwardly from the radial web 292.

Figure 21:
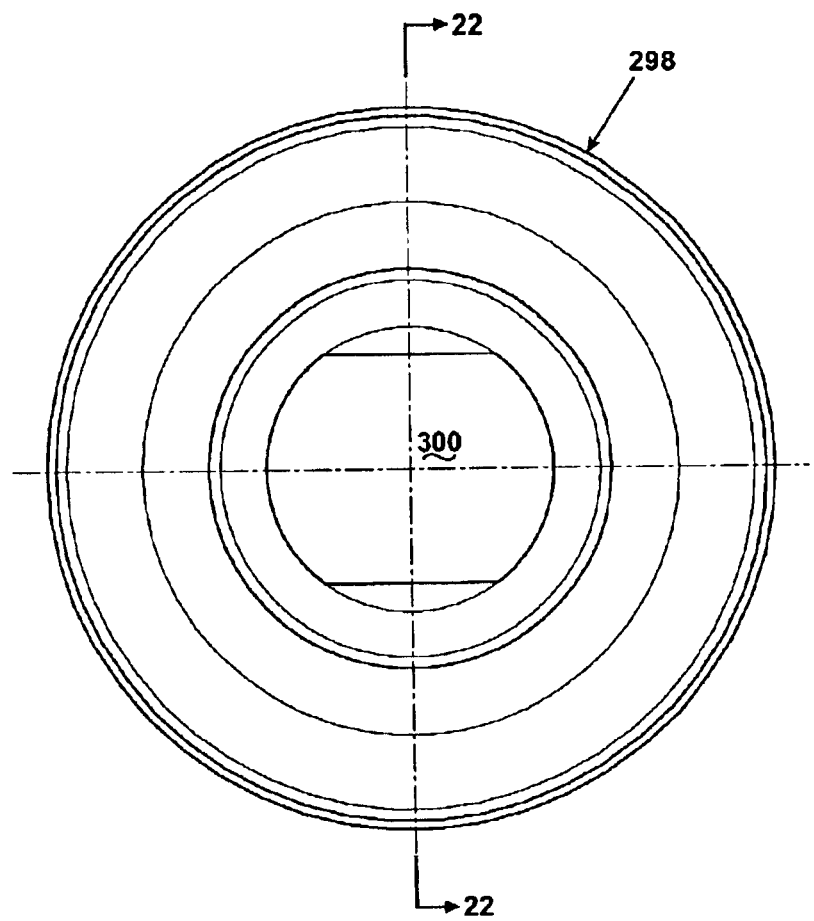
FIG. 21 is an end view of a cover for sealing the cover relative to the shaft.
Figure 22:
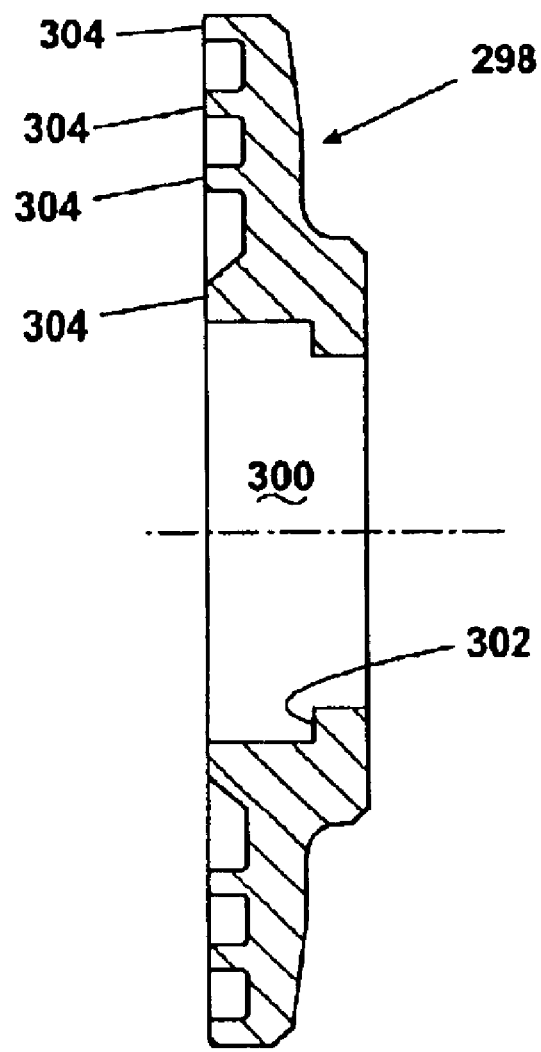
FIG. 22 is a sectional view taken along line 22—22 of FIG. 21.

Referring to FIGS. 21 and 22, a cover 298 is provided and has an axial opening 300 into which extends an annular stop 302. Concentric rings 304 are formed on the inner surface of the cover 298 and mesh with concentric rings 306 circumscribing the central hub opening to form a labyrinth seal when the cover 298 is mounted to the end cap 282.

Figure 23:
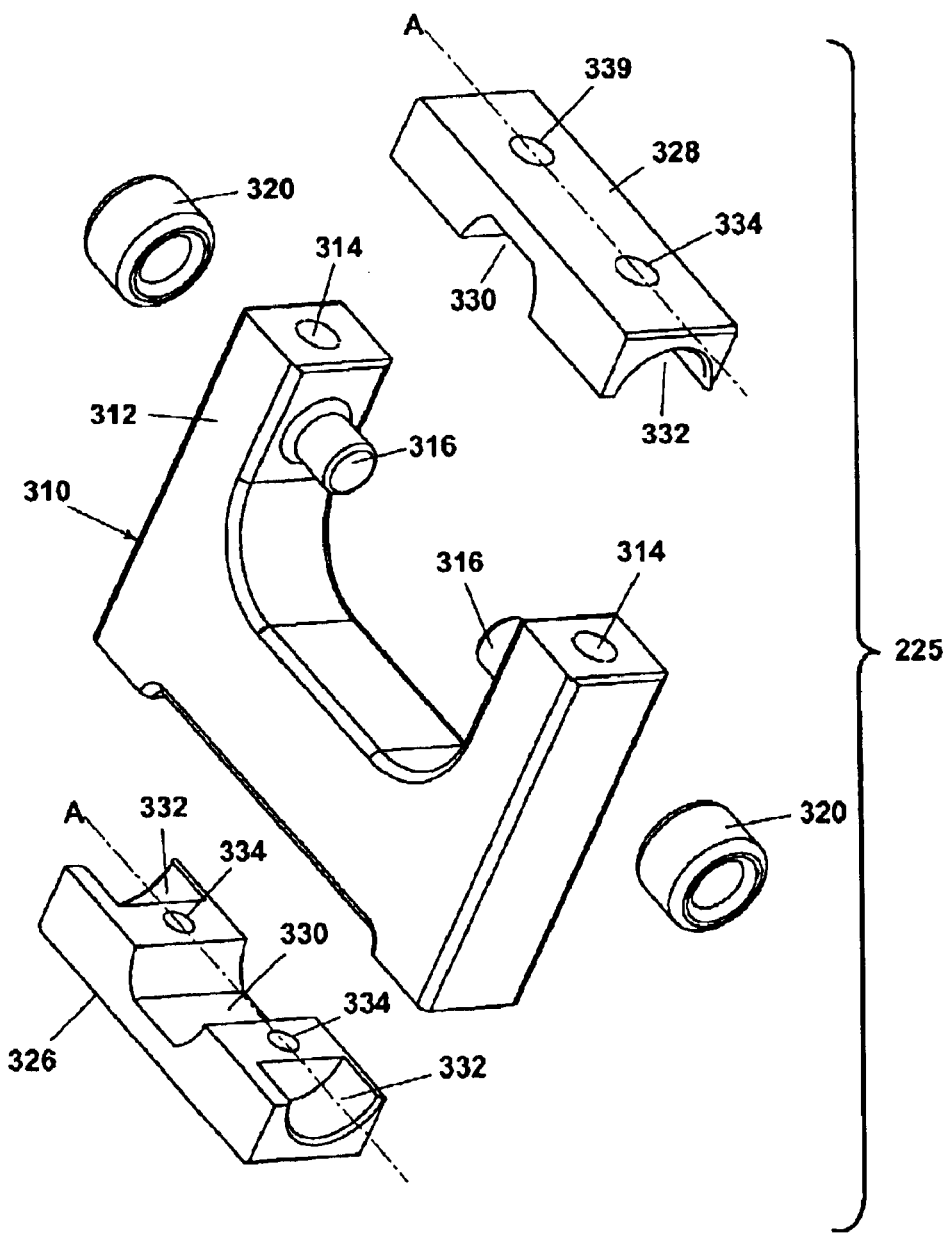
FIG. 23 is an exploded view of the mounting block according to the invention.

FIG. 23 illustrates the mounting block 225 according to the invention. The unique construction of the mounting block 225 damps vibrations of the motor in all directions while maintaining torsion stability so performance of the motor in applications is not compromised. The mounting block 225 comprises a generally U-shaped yoke 310 where each arm 312 has an aperture 314 extending through it to accommodate threaded mounting bolts 316. A pin 318 extending inwardly from each arm 312, receives an elastomeric bushing 320. A clamp 322 compressively retains the end key 224H by bolts 324. The clamp 322 comprises a lower connection plate 326 and an upper connection plate 328, each designed to cooperate with the other to clamp the end key 224H. Both plates 326, 328 have a centrally located key-shaped recess 330 complementary in shape to the end key 224H. Both also have a semi-cylindrical recess 332 open at each end and offset from a centerline A through each plate. The diameter of the semi-cylindrical recess is equivalent (or nearly so) to the diameter of the bushing 320. An aperture 334 is located between the key-shaped recess 330 and each semi-cylindrical recess 332 in each plate. The apertures 334 in the lower plate are preferably threaded.

Figure 24:
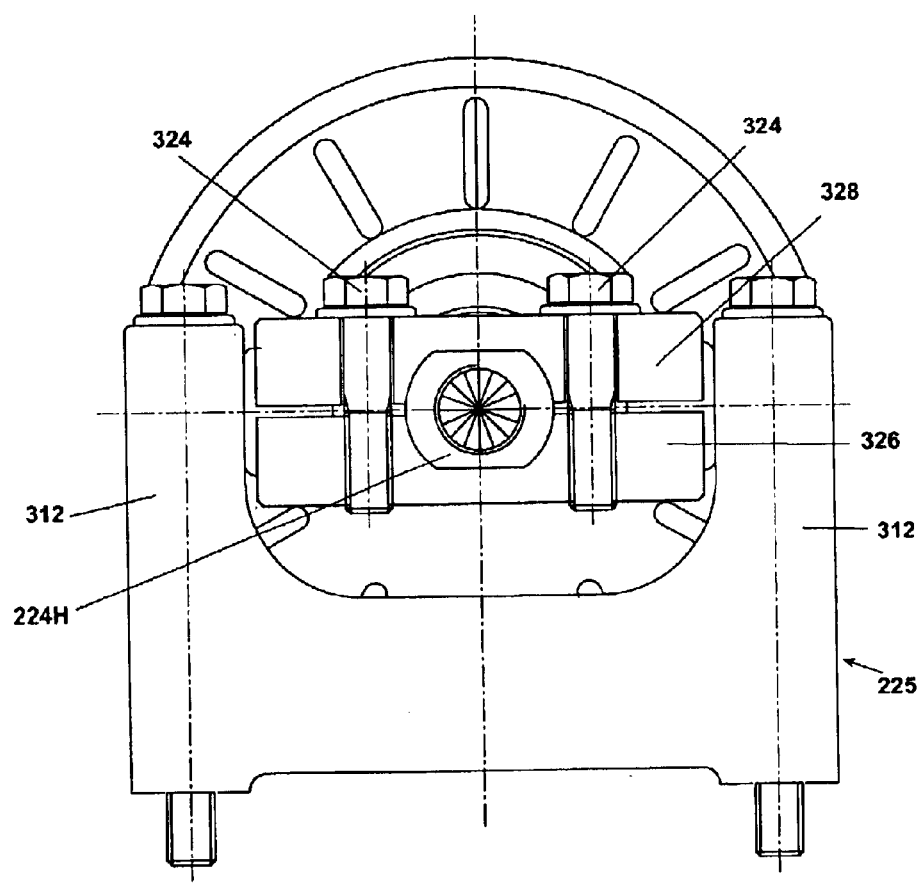
FIG. 24 is an end view of an assembled motor according to the invention mounted to the mounting block.

When assembled as shown in FIG. 24, the connection plates 326, 328 are secured to each other by bolts 324 with the end key 224H of the motor nested in the key-shaped recesses 330, and the bushings 320 over the pins 316 received in the semi-cylindrical recesses 332. Thus, it will be seen that the entire motor assembly is supported on the yoke 310 by the elastomeric bushings 320. With no metal-to-metal contact, vibrations generated by the motor are fully absorbed by the bushings 320, thereby reducing noise.

Figure 25:
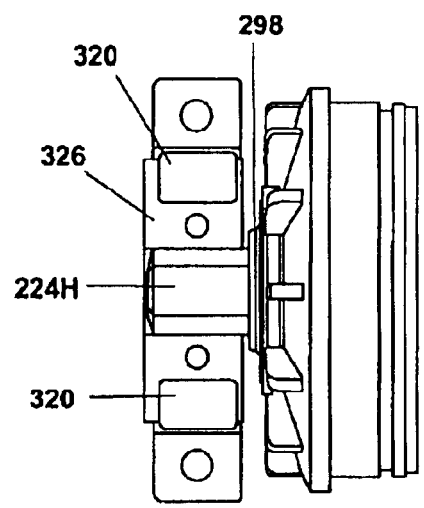
FIG. 25 is a plan sectional view of the mounting block and a portion of the motor taken along line 25—25 of FIG. 24.
Figure 26:
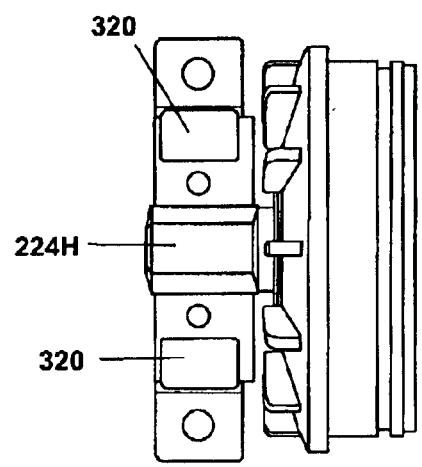
FIG. 26 is a plan sectional view of the mounting block and a portion of the motor similar to FIG. 24 in an alternate arrangement.
Figure 27:
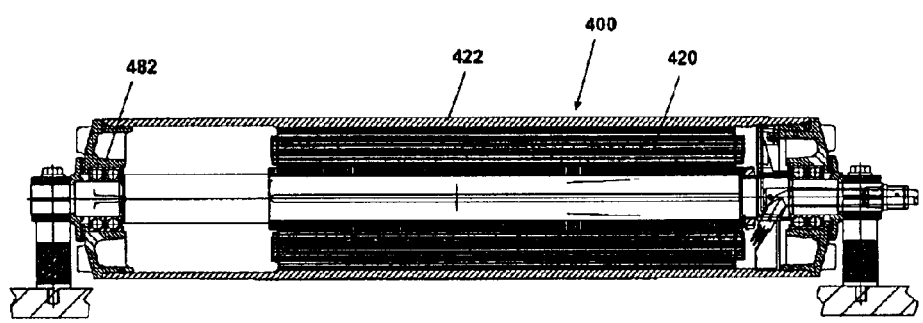
FIG. 27 is a cross sectional view of a one variation of a third embodiment of an electric motor with external rotor according to the invention.

Moreover, the eccentric location of the semi-cylindrical recesses 332 enables use of the mounting block 225 with or without a cover plate 98, 298. It will be understood that use of the cover plate 98, 298 (see FIGS. 2, 7, 11, and 22) is optional. As shown in FIG. 25, where the cover plate 298 is used, for example, the connection plates 326, 328 are positioned with a flush side 336 adjacent to the cover plate. On the other hand, in FIG. 26, where a cover plate is not used, the connection plates 326, 328 are positioned with a projecting side 338 adjacent to the motor to occupy some of the space that would have otherwise have been occupied by the cover plate.

Assembly of the Second Embodiment of the Electric Motor

The assembly of the second embodiment electric motor 210 will now be described. As with the first embodiment electric motor 10, the exact sequence of the assembly steps is not important to the invention. The assembly steps are merely described for a better understanding of the invention and the sequence should not be considered limiting.

The assembly process in the stator 220 is critical to obtaining the required stiffness so that the stator will resist deflection when it is subjected to magnetic forces. This is because the air gap between the rotor and the stator is very small, on the order of 1 mm. Changes in the air gap are naturally introduced by manufacturing tolerances and other influences. Different dimensions in the air gap between one end of the motor and another will urge the stator to bend or deflect, and too much deflection may result in contact between the rotor and the stator, effectively destroying power output from the motor.

The stator 220 is assembled in one of two methods. The first method utilizes the keyway 224I if present in the shaft 224. A spacer 288 is placed over the shaft to bear against the annular shoulder 224B. Multiple plates 242, each having a key opening corresponding to the size and shape of the keyway 224I, are then slid onto the control end of the shaft 224, the first plate bearing against the spacer 288, and each succeeding plate bearing against the preceding plate. Each plate is preferably formed of stamped tin, having a thickness of 0.35 mm. Approximately 980 plates are thus positioned on the shaft, the exact number depending on the length of the shaft and ultimately on the size of the motor. It has been found that the upper limit in length for the methods illustrated is about 20" for the motor. The key 246 of each plate is aligned with the shaft keyway 224I as the plates 242 are inserted thereon. The alignment of the plate key 246 with the shaft keyway 224I and the sliding insertion of the plate 242 over the shaft 224 build the winding poles 250 of the winding core 240.

Once the plates 242 are mounted on the shaft 224, a second spacer 288 is slidably mounted over the shaft and held in abutting contact with the plates 242. Importantly, the plates are then compressed against each other by, for example, a hydraulic press. The compression force is such as to create a lamination of plates, and is in a range of $6 \times 10^4$ to $10 \times 10^4$ Newtons. A locknut 289 is then threaded onto the shaft against the spacer 288 with sufficient torque to hold the lamination together under compression. The compression effectively makes the stator 3 times stiffer than it would otherwise be, so as to resist bending moments introduced into the stator by the magnets of the rotor. The windings 256 are then formed by wrapping wire around the winding poles 250 in a traditional manner.

The second method of constructing the stator utilizes a jig or a cage when there is no keyway in the shaft 224. The cage is essentially a hollow cylinder having one or more guides protruding inwardly from the wall. The guide or guides extend the length of the cage and are disposed at an angle of 10° relative to the longitudinal axis of the cage. The guide is sized to correspond to a complementary shaped guide or the gap between the poles in each of the plates. The plates are stacked in the cage, with the guides orienting the plates in the proper position adjacent to each other. A spacer 288 is disposed at each end of the stack. The shaft 224 is then pressed hydraulically into the center aperture of the plate stack until the spacer 288 on one end abuts the annular shoulder 224B.

In the same pressing action, or in a separate step, the plates are compressed into a lamination by the aforementioned compression force and the lock nut is threaded on to the shaft to hold the lamination together.

Once the windings 256 are assembled around the winding poles 250, the stator 220 and rotor 222 can be assembled. Preferably, the stator 220 is slidably inserted into the interior of the rotor 222. Since the rings 260 will have preferably already been magnetized, the stator 220 will be drawn into contact with the magnetized rings 260 of the rotor 222. The stator 220 can then be slidably inserted through the interior of the rings 260 of the rotor 222. As with the first embodiment, a lubricant can be used to reduce the coefficient of friction between the stator 220 and the rotor 222.

The mounting of the end caps 82 and bearing 86 to the housing 280 is identical to that previously described with the first embodiment and will not be described in detail. Once the end caps 282, ceramic bearings 286, and cover 298 are assembled, the assembly is ready to be mounted to the mounting blocks 225 as discussed above.

Third Embodiment

A third embodiment of the motor 410 according to the invention is illustrated in FIGS. 27–32. The third embodiment electric motor 410 comprises many components physically and functionally similar to or identical with the second embodiment electric motor 210. Therefore, to the extent possible, components of the second embodiment similar to those of the first embodiment will have a similar identifying numeral increased by 200.

The principal differences between the third embodiment and the second embodiment lie in length of the rotor 422 and the structure of the sensors that detect the location of the winding at any given moment. In a variation of the third embodiment shown in FIG. 27, it can be seen that the rotor 422 and the shaft 424 are elongated so that there is a space between one end and the laminations on the stator. In other words, the lamination is not centered between the two ends of the motor. Centering is not critical for the motor to function effectively. However, there is a limit to the length that can be achieved, that limit begin determined by the tendency of the shaft to deflect due to bending moments introduced by the magnets.

Figure 28:
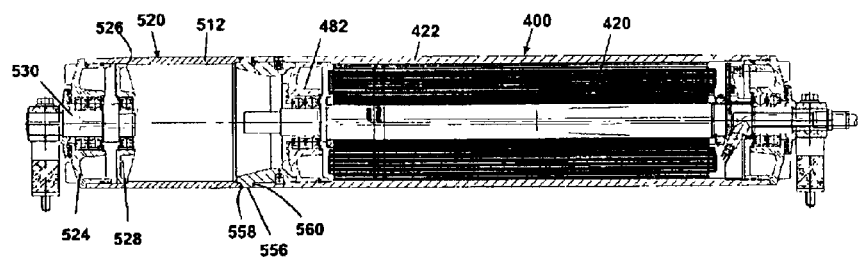
FIG. 28 is a cross sectional view of a second variation of the third embodiment of the motor according to the invention.
Figures 31, 32:
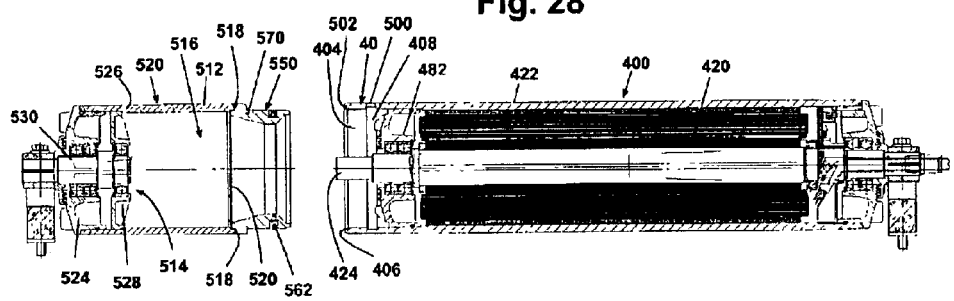
FIG. 31 is a cross sectional view of a portion of the motor shown in FIG. 28.
FIG. 32 is a cross sectional view of an extension portion of the motor shown in FIG. 28.

In order to obtain longer lengths for certain applications, such as treadmills, the variation of FIGS. 28 32 has been found to be an acceptable solution. Looking first at FIGS. 28, 29 and 31, it will be seen that the motor portion 400 has a coupling portion 402 extending past an end cap 482. The coupling portion 402 has an open end 404 defined by an annular edge 406 at the end of the rotor 422. Just past the end cap 482 in the coupling portion 402 is an internal annular groove 408 and a plurality of apertures 500 extending through the wall of the coupling portion to the groove. At least one slot 502 is formed in the annular edge 406. It will be understood that the shaft 424 of the stator 420 terminates at some point past the end cap 482.

Figure 29:
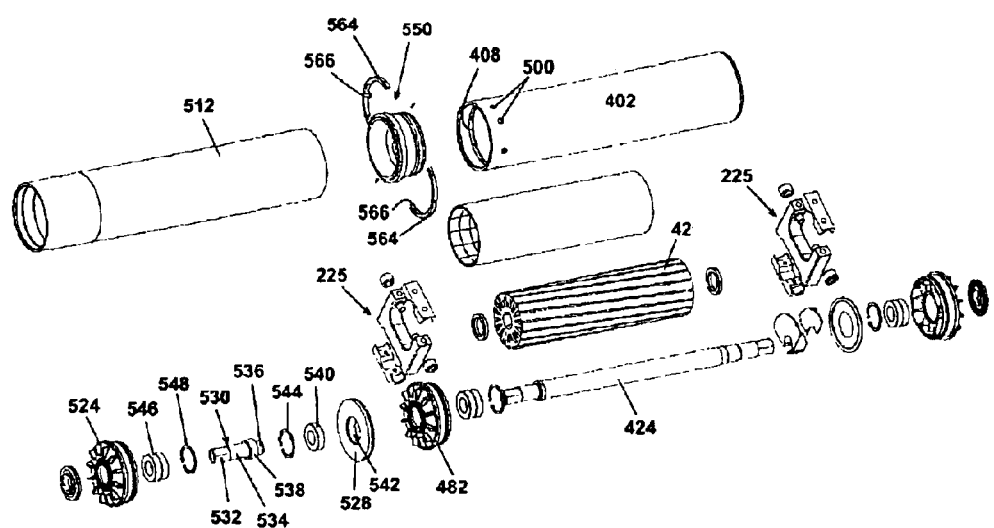
FIG. 29 is an exploded view of the third embodiment of the motor according to the invention.
Figure 30:
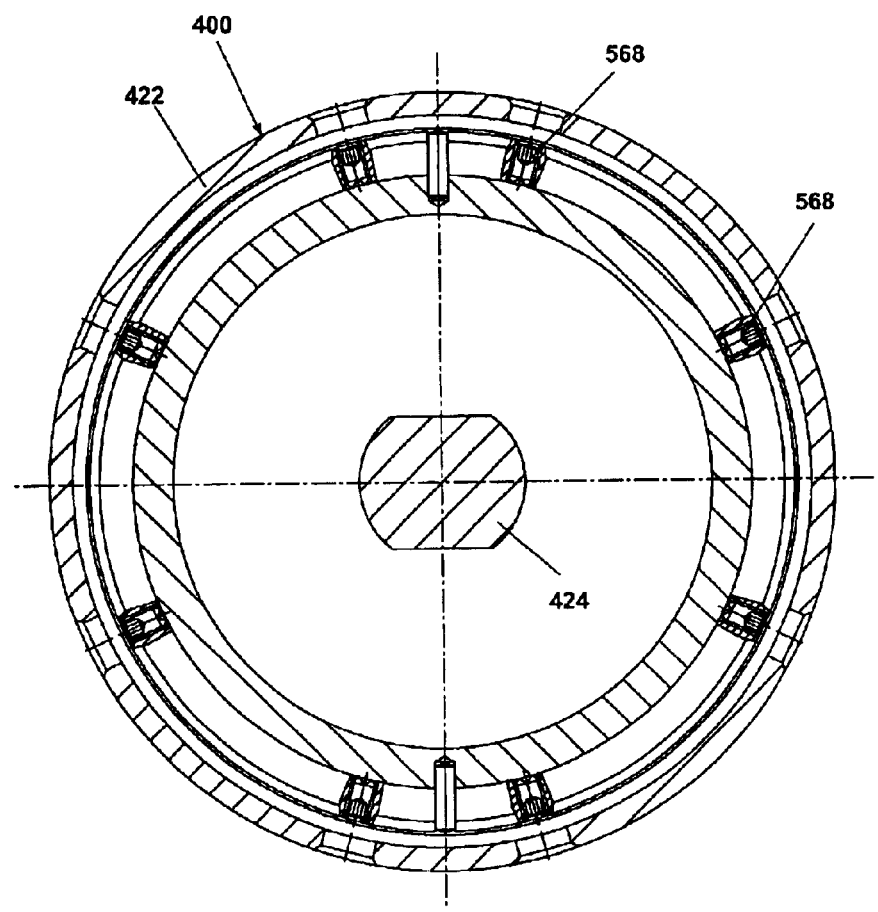
FIG. 30 is a cross sectional view taken along line 30—30 in FIG. 28.

FIGS. 28, 29, and 32 best illustrate an extension portion 510 by which the motor portion 400 is extended in length. The extension portion 510 comprises a rotor extension 512 and an axle assembly 514. The rotor extension 512 is a cylindrical structure having essentially the same diameter, thickness, and composition of the rotor 422. A proximal end 516 of the rotor extension 512 terminates in an annular edge 518, and, slightly inboard of the annular edge, and proximal annular shoulder 520. The distal end 522 of the rotor extension 512 is closed by an end cap 524 having essentially the same construction as the end cap 482 of the motor. The end cap 524 is preferably secured to the rotor extension by press fit and/or by welding. A distal annular shoulder 526 lies inboard of the end cap 524.

The axle assembly 514 comprises a support block 528 and an axle 530. The support block 528 is a reinforced disk press fit into the distal end 522 of the rotor extension 512 against the distal annular shoulder 526. The axle 530 has a keyed end 532, and first and second bearing surfaces 534, 536 separated by an annular spacing boss 538. A first bearing 540 is secured in a central opening 542 of the support block 528 by a split ring 544 and a second bearing (preferably double) 546 is secured in the end cap 524 by another split ring 548. The axle is mounted with the first bearing surface 534 received in the second bearing 546 and the second bearing surface 536 received in the first bearing 540. It will be understood that the longitudinal axis of the axle 530 is collinear with the longitudinal axis of the shaft 424.

A coupler 550 connects the extension portion 510 to the coupling portion 500. The coupler 550 is a hollow tube having a first annular edge 552 at one end and a second annular edge 554 at the other end. A radial rib 556 extends outwardly from the tube near the first annular edge and has an outer diameter essentially equal to the outside diameters of the rotor 422 and the extension portion 510. The radial rib is bounded on one side a first annular shoulder 558 and on the other side by a second annular shoulder 560. The coupler 550 is secured to the extension portion 510 by press fit and/or welding with the first annular edge 552 of the coupler 550 abutting the proximal annular shoulder 520 of the rotor extension 510 and the proximal annular edge 518 of the rotor extension abutting the first annular shoulder 558 of the coupler. If needed, a weldment is disposed at the junction of the proximal annular edge 518 of the rotor extension and the first annular shoulder 558 of the coupler.

Between the radial rib 556 and the second annular edge 554 is an outer annular groove 562. Looking now also at FIG. 30, a split clamp ring 564 is disposed in the outer annular groove 562. The clamp ring 564 comprises two half rings each having a plurality of threaded apertures 566. The threaded apertures 566 are positioned to be in registry with the apertures 500 in the coupling portion 402 of the rotor 400. Clamp ring bolts 568 are threaded into the apertures 566. A pair of locator pins 568, disposed 180° from each other, is mounted in the coupler 550 in the outer annular groove 562 to maintain location of the clamp ring 564 with the apertures 500 and 566 in registry. When the clamp ring bolts 568 are turned out, the clamp ring 564 nests within the outer annular groove 562.

In this position, the second annular edge 552 of the coupler 550 can be received in press fit engagement into the open end 404 of the coupling portion 402 of the rotor 422. Upon coupling, it will be seen that the second annular edge 552 of the coupler 550 will abut the end cap 482 and/or the annular edge 406 of the coupling portion 402 will abut the annular shoulder 560 of the coupler 550. Simultaneously, the clamp ring 564 comes into registry with the annular groove 408. when the clamp ring bolts 568 are turned in, the clamp ring 564 is caused to move out of the outer annular groove 562 in the coupler 550 into the annular groove 408 in the coupling portion 402, thus clamping the coupler to the coupling portion. For further securement, a safety pin 570 projects from the coupler 550 near the annular shoulder 560 to be received in the slot 502 to prevent rotation of the coupler relative to the coupling portion.

The key 532 of the axle 530 is secured to a mounting block as described above and the outboard end of the shaft 424 is secured to another mounting block as described above. With the extension portion 510 thus secured to the rotor 402 and the alignment of the axle with the shaft, it will be apparent that rotation of the rotor will also rotate the extension portion. The motor can thus be used with wider belts, e.g., in treadmills, etc.

Position Sensor

Figure 33:
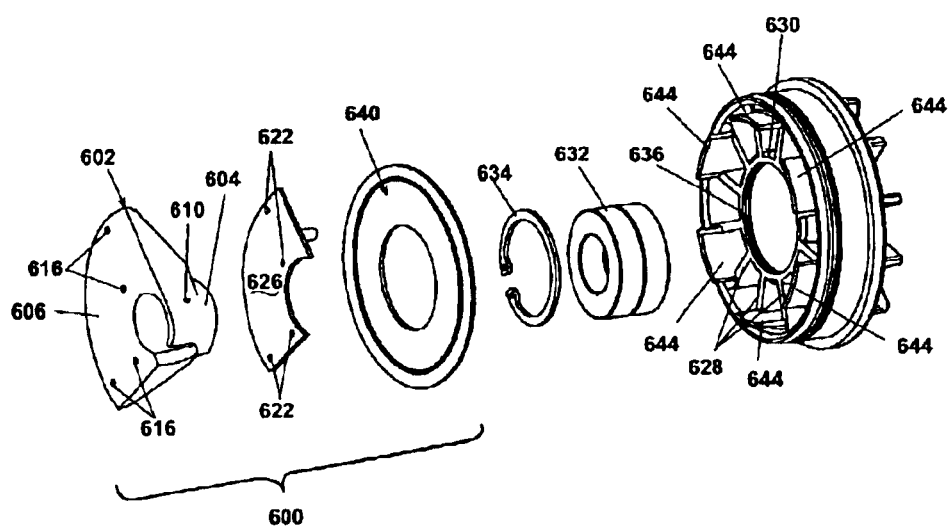
FIG. 33 is an exploded left hand view of a sensor assembly according to the invention.
Figure 34:
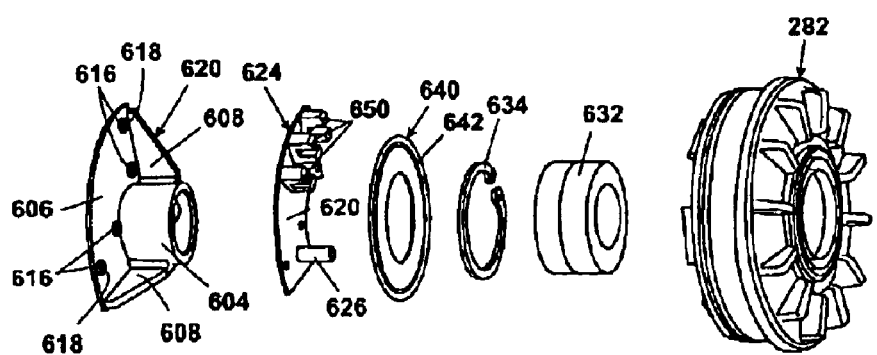
FIG. 34 is an exploded right hand view of the sensor assembly of FIG. 33.

The invention encompasses a novel position sensor 600 best illustrated in FIGS. 33 and 34, but equally applicable to all embodiments. The position sensor 600 comprises a mounting bracket 602 having a tubular portion 604, a flange portion 606, and reinforcing ribs 608 extending between the tubular portion and the flange portion. The tubular portion 604 has an inside diameter approximately equal to the outside diameter of the sensor portion 224E of the shaft 224 so that the bracket 602 can be received over the shaft and mounted thereto. A pinhole 610 in the tubular portion 604 is sized to receive a mounting pin 612, with the bracket so positioned that it is in registry with a hole 614 in the shaft. When the pin 612 is press fit into both holes 610, 614, the bracket 602 will be fixedly secured to the shaft 224 with the flange portion 606 parallel to and spaced from the last plate 242 in the stator.

The flange portion 606 has several apertures 616, preferably threaded, with spacers 618 surrounding each aperture. A sensor plate 620 also has several apertures 622, positioned to be in registry with the apertures 616 on the flange portion 606. The sensor plate 620 carries the sensors 624, 626 as explained in more detail below.

The end cap 282 has a series of internal ribs 628 extending radially from a hub 630. The hub 630 is sized to receive the bearing 632 in conventional manner, and which is retained therein by a split ring 634. The annular end 636 of the hub 630 is flat and at least a portion of the adjacent ribs 628 are flush with the annular end 636 to create an effective flat within which to receive an optical disk 640. The optical disk is preferably thin steel (on the order of 0.2 mm thick) and has a track 642 of very thin, radial grooves (on the order of 0.1 mm wide). The radius of the track 642 is such that the number of groves exceeds 1,000. The disk 640 is glued or otherwise fixed to the annular end 636 of the hub 630. A series of plates 644 extend axially from the end cap 282 in alternating spaces between pairs of ribs 628. Each plate 644 is arcuate, following the radius from the longitudinal axis of the hub 630.

A Hall effect sensor 624 comprises a series of C-shaped magnets 650 positioned on the sensor plate 620 so that the plates 644 will pass through the open space between the arms of each magnet. It will be understood that the end cap 282 is positioned relative to the windings so that the plates 644 will correspond to a given pole of the winding. Thus, as the plates 644 pass through the magnets 650, the Hall effect enables the sensor 624 to determine the position of the winding at any given moment in the rotation of the rotor.

If greater accuracy in determining the position is needed at any given moment, the second sensor 626 is an opto-reflector type comprising an illumination source (e.g. LED) directed toward the track 642 on the optical disk 640 and a receiver (e.g., an photo-electric transistor) to detect reflections from the track. Each time a groove in the track 642 passes the opto-reflector sensor, followed by a reflection from the adjacent flat before the next groove passes, a corresponding pulse signal is generated and sent to the controller for processing.

While the invention has been specifically described in connection with certain specific embodiments thereof, it is to be understood that this is by way of illustration and not of limitation, and the scope of the appended claims should be construed as broadly as the prior art will permit.

What is claimed is:

1. In an electric motor of the type comprising an internal stator, including a shaft fixedly mounted to a structural support and having multiple windings capable of reversible current flow to alter the winding polarity, and an external rotor rotatably mounted to the shaft and having multiple magnets radially spaced about the periphery of the stator, with each of the magnets having at least one predetermined pole; the improvement wherein:

the stator comprises a plurality of plates on the shaft under compression in a range of approximately $6 \times 10^4$ and $10 \times 10^4$ Newtons to sufficiently inhibit bending of the shaft due to external forces that would otherwise tend to cause the windings to contact the magnets.

2. The electric motor according to claim 1, wherein the plurality of plates forms a winding core that carries the multiple windings.

3. The electric motor according to claim 2, wherein the plates form winding poles with caps on the end of each pole to retain the windings on the winding poles.

4. The electric motor according to claim 1, wherein the plates are held in the compression range by at least one lock nut.

5. The electric motor according to claim 4 wherein the locknut is threaded onto the shaft.

6. The electric motor according to claim 4 wherein the length of windings is less than about 20 inches.

7. The electric motor according to claim 6 wherein the plurality of plates comprises approximately 980 plates.

8. The electric motor according to claim 4 wherein the ratio of the length of the windings to the diameter of the external rotor is approximately 5:1.

9. The electric motor according to claim 1, wherein the plurality of plates form winding poles that define a winding axis, oriented such that the winding axis is not parallel to the shaft longitudinal axis.

10. The electric motor according to claim 9, wherein the winding axis is at an angle of at least 10 degrees relative to the shaft longitudinal axis.

11. The electric motor according to claim 9 wherein the length of windings is less than about 20 inches.

12. The electric motor according to claim 11 wherein the plurality of plates comprises approximately 980 plates.

13. The electric motor according to claim 1 wherein the shaft has an annular shoulder and the plurality of plates is compressed between a locknut and the annular shoulder.

14. The electric motor according to claim 13 wherein the locknut is threaded onto the shaft.

15. The electric motor according to claim 13 wherein the length of windings is less than about 20 inches.

16. The electric motor according to claim 15 wherein the plurality of plates comprises approximately 980 plates.

17. The electric motor according to claim 13 wherein the ratio of the length of the windings to the diameter of the external rotor is approximately 5:1.

18. The electric motor according to claim 1 wherein the spacing between the magnets and periphery of the stator is approximately 1 mm or less.

19. The electric motor according to claim 18 wherein the magnets are neodymium.

20. The electric motor according to claim 1 wherein the magnets are neodymium.

21. The electric motor according to claim 1 wherein the length of windings is less than about 20 inches.

22. The electric motor according to claim 21 wherein the plurality of plates comprises approximately 980 plates.

23. The electric motor according to claim 21 wherein the ratio of the length of the windings to the diameter of the external rotor is approximately 5:1.

24. The electric motor according to claim 1 wherein the plurality of plates comprises approximately 980 plates.

25. The electric motor according to claim 1 wherein the ratio of the length of the windings to the diameter of the external rotor is approximately 5:1.

* * * * *

UNITED STATES PATENT AND TRADEMARK OFFICE
CERTIFICATE OF CORRECTION

PATENT NO. : 6,879,078 B2
DATED : April 12, 2005
INVENTOR(S) : Wolters, Laurens

It is certified that error appears in the above-identified patent and that said Letters Patent is hereby corrected as shown below:

Column 2,
Line 27, change "would otherwise rend" to -- would otherwise tend --;

Column 6,
Line 14, change "The coefficient of fiction" to -- The coefficient of friction --

Signed and Sealed this

Twenty-first Day of June, 2005

JON W. DUDAS
*Director of the United States Patent and Trademark Office*